Jan. 1, 1924

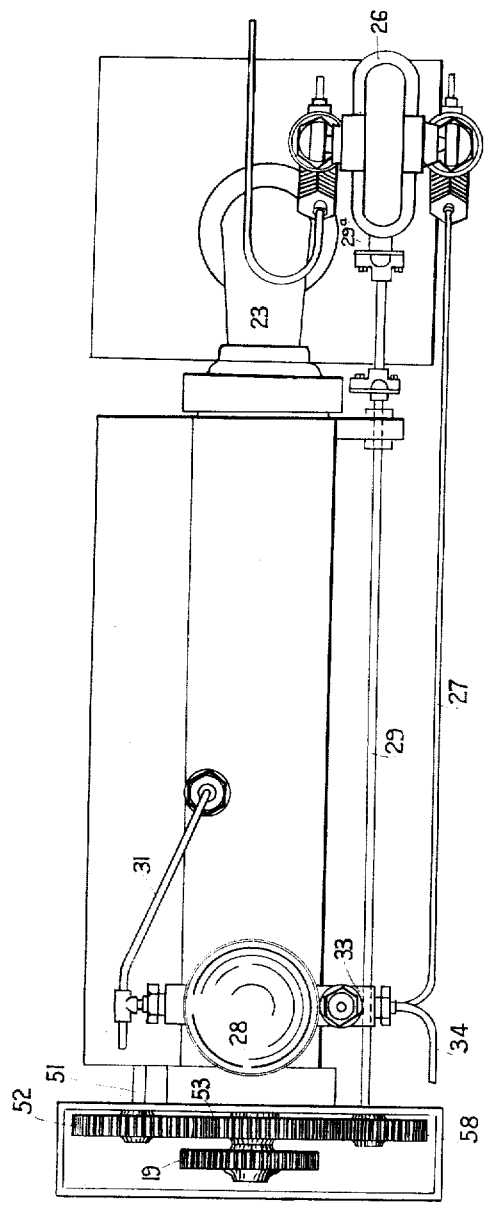

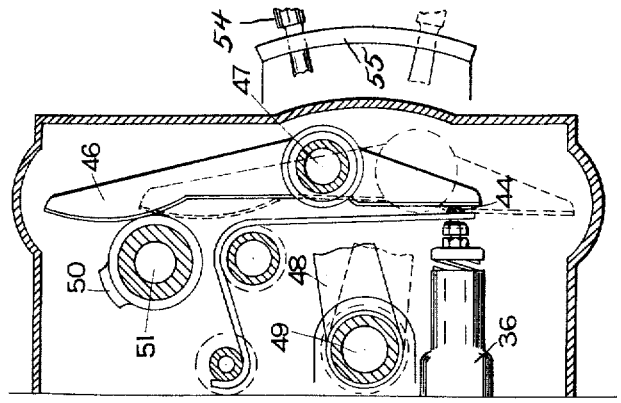
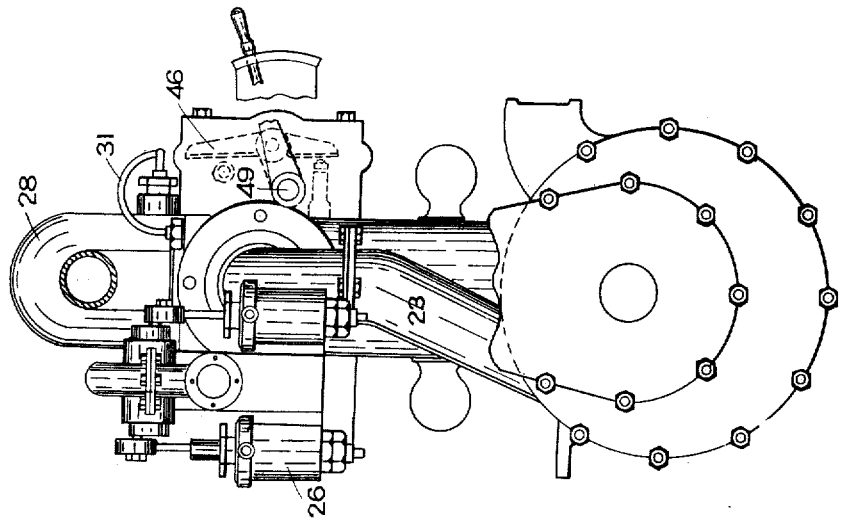
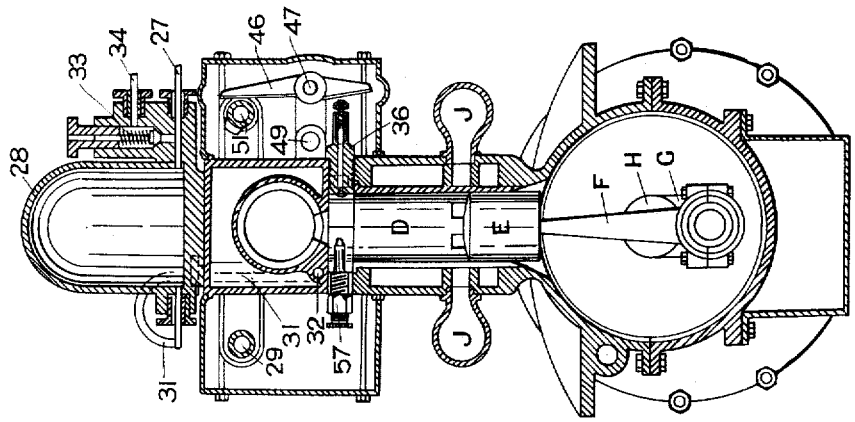

G. W. GRAYSON

INTERNAL COMBUSTION ENGINE

Filed Sept. 30, 1921

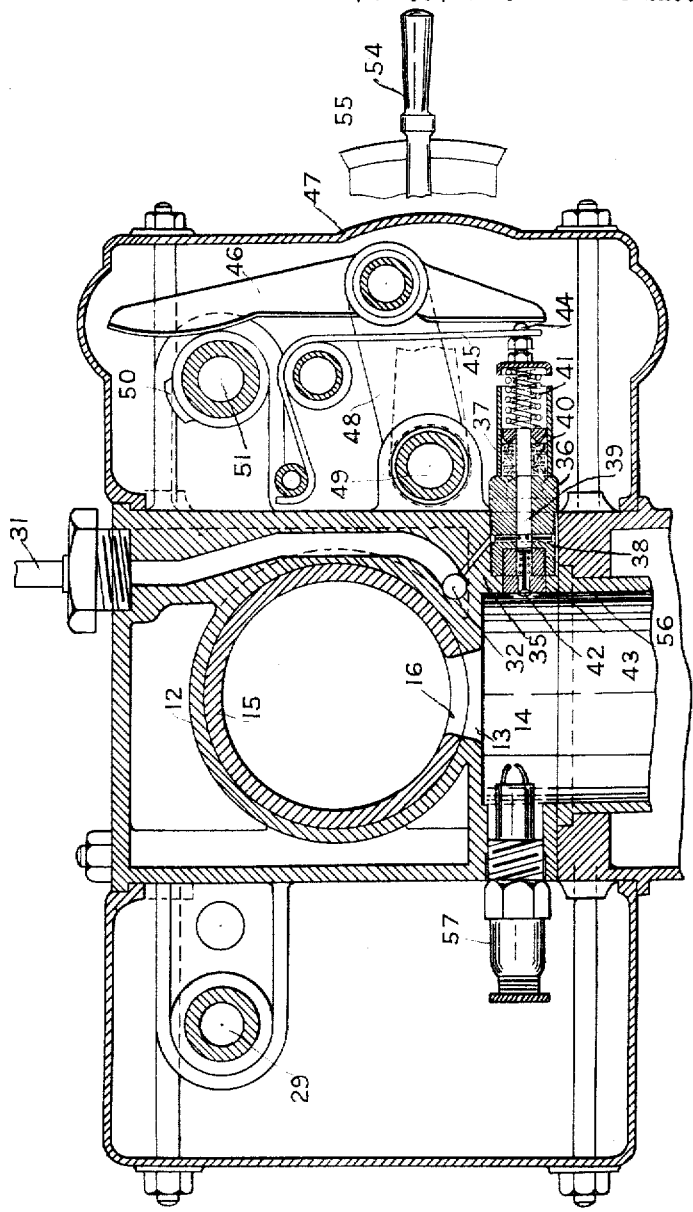

Patented Jan. 1, 1924.

1,479,710

UNITED STATES PATENT OFFICE.

GEORGE WENTWORTH GRAYSON, OF SYDNEY, NEW SOUTH WALES, AUSTRALIA.

INTERNAL-COMBUSTION ENGINE.

Application filed September 30, 1921. Serial No. 504,294.

*To all whom it may concern:*

Be it known that I, GEORGE WENTWORTH GRAYSON, a subject of the King of Great Britain and Ireland, residing at 19 Tusculum, Tusculum Street, Potts Point, Sydney, in the State of New South Wales, Commonwealth of Australia, have invented certain new and useful Improvements in and Relating to Internal-Combustion Engines, of which the following is a specification.

This invention relates to improvements in combustion engines of the two cycle type and the object of the invention is to provide an improved fueling system for high speed engines of this type.

It has been found in practice that the admission of fuel to internal combustion engines in the solid form is advantageous but mechanical difficulties have prevented its adoption with engines having higher speeds than say 350 to 400 revolutions per minute.

A further difficulty has been the necessity for exact calibration of the fuel admission orifice and facility for automatic variation of fuel supply in small cylinder engines to meet instantly the increase or decrease demand of power output variations.

This invention which has been designed to overcome these difficulties comprises a high pressure pump adapted to run at low speed, and to deliver liquid fuel to a pressure accumulator from which the said fuel passes under pressure into a superheating chamber formed in the wall of the combustion chamber of the engine. From the superheating chamber, the liquid fuel passes under pressure to a fuel injection valve the mouth of which is directed into the combustion chamber. The injection valve is mechanically operated by an adjustable lever adapted to oscillate about a pivot, which lever is actuated by a cam shaped and set in accordance with the correct timing for fuel injection. But in order that the invention may be clearly understood reference will now be made to the drawings in which the invention is illustrated as applied to a six cylinder two cycle engine of the type having a rotary air supply valve.

Figure 1 is a longitudinal vertical section showing general design of engine to which this invention is applied Figure 2 is plan of same.

Figure 3 is a transverse section on line A. A. Figure 1.

Figure 4 is an end view of Figure 1.

Figure 1:
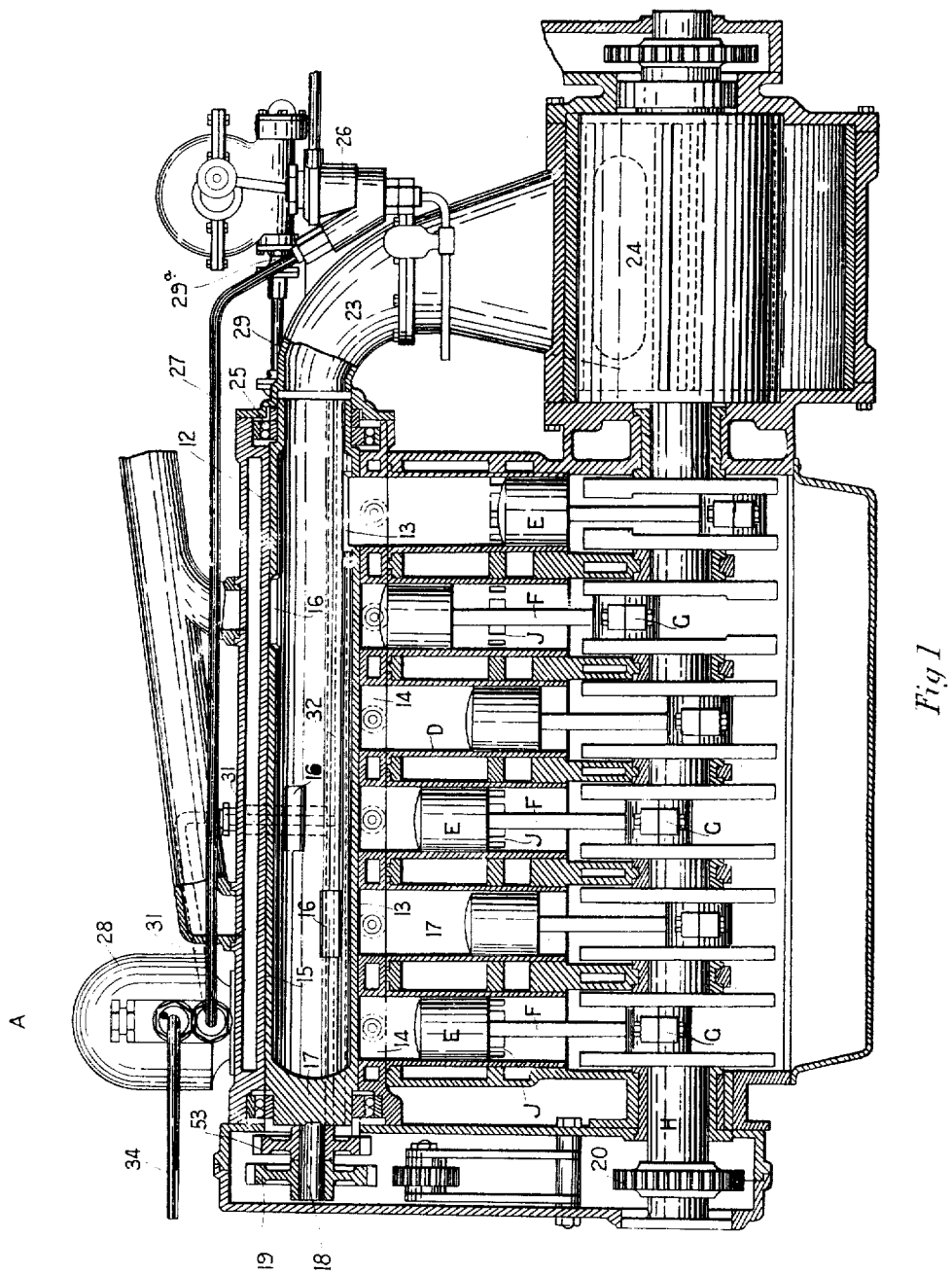
Figure 6:
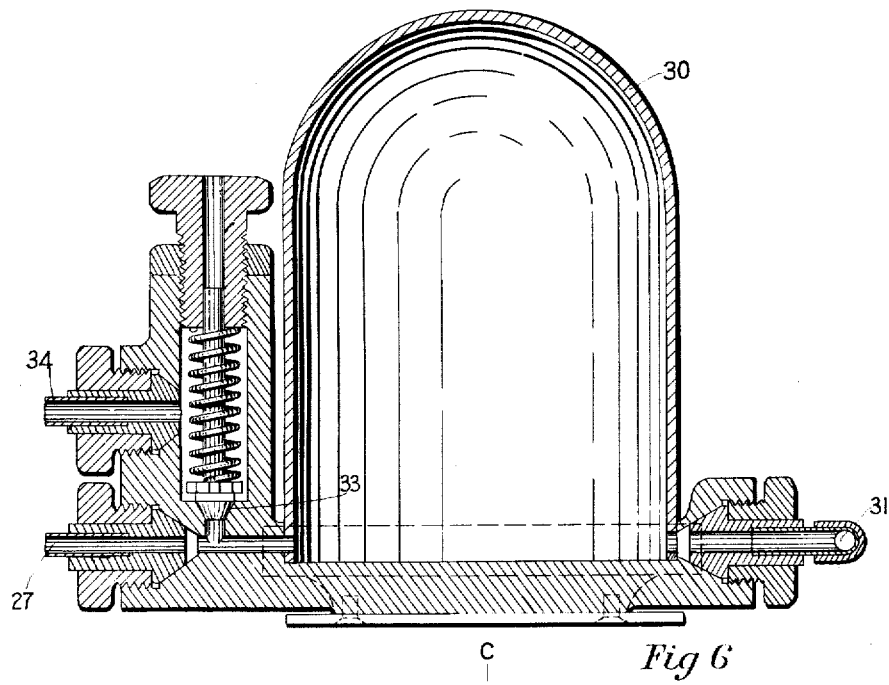
Figure 5:
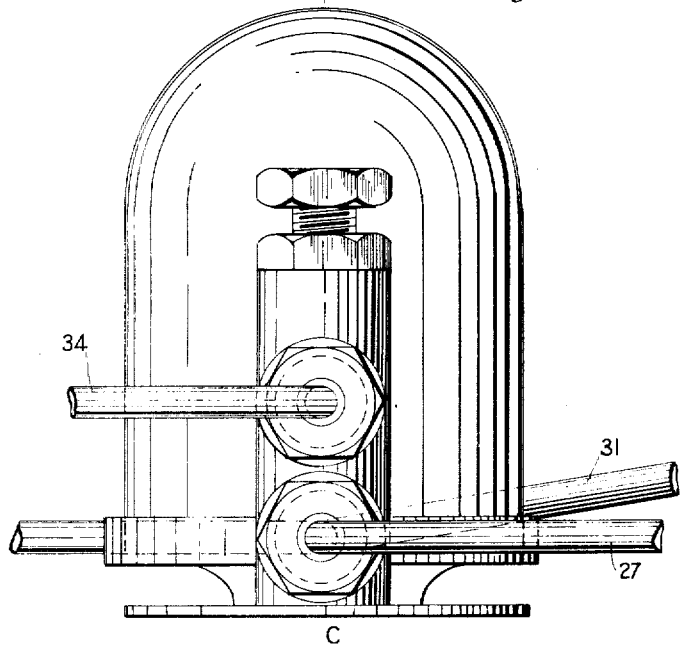
Figure 5 is an enlarged view of pressure accumulator.

Figure 6 is a section on line C. C. Figure 5.

Figure 7 is enlarged section of cylinder head showing fuel injection valve and valve operating gear.

Figure 8 is a diagrammatic view showing the operation of the fuel injection valve.

The engine illustrated in the drawings is of the two cycle type and has the usual cylinders D, pistons E, connecting rods F, cranks G, crankshaft H, exhaust ports J, and as the fueling system which forms the subject of this invention is of the solid injection type and therefore independent of the air supply the drawings illustrate an air supply valve suitable to be used in combination with this invention.

The air valve comprises a longitudinal cylindrical casing 12 with ports 13 that communicate with the combustion chamber 14 in engine cylinders D. Within the casing 12 and in rotating contact therewith is a hollow cylindrical valve 15 with radial ports 16 overlying each cylinder head and so positioned around the periphery as to register in turn (as the valve rotates) with the ports therein.

The hollow valve 15 which is mounted in ball bearings 25 is rotated by means of a chain drive connecting the sprocket wheel 20 on crank shaft H with sprocket wheel 19 on trunnion 18 projecting from valve 15.

The valve 15 is closed at one end 17 and is connected at the other end to a pipe 23 leading from an air pump 24.

The improved fueling system which forms the subject of this invention comprises a high pressure pump 26 adapted to pump liquid fuel from a supply tank and deliver same through pipe 27 to a pressure accumulator 28. The pressure pump 26 is situated in any suitable position and is driven from the crank shaft H by shaft 29 from the gear wheel 58 and is adapted to run at a low speed by means of an intermediate worm gear 29ᵃ.

The pressure accumulator 28 into which the fuel is pumped through pipe 27 consists of a domed receptacle 30 from the bottom of which a pipe 31 leads to a longitudinal heating chamber 32 which extends along the tops of the combustion chambers 14 and is cast integrally therewith so as to be in contact with the heat generated therein.

In order to ensure a uniform pressure in the accumulator a spring controlled relief valve 33 is provided so that any surplus fuel will be returned through the pipe 34 to the supply tank.

From the fuel superheating chamber 32 fuel under pressure is conveyed through ducts 35 to the fuel injection valves 36 one of which is provided in each combustion chamber. The injection valve comprises a body or casing 37 which is in communication with the fuel duct 35 through a ring of ports 38, a piston 39 movable within the valve body 37 with suitable packing 40 and held in normal position by a spring 41 and an inlet valve 42 within the combustion chamber 14 which is held on its seat by a spring 43. The projecting free end 44 of the piston 39 is engaged by a leaf spring 45.

The fuel injection valve is mechanically operated by a rocking lever 46 which oscillates about a pivot 47 on a crank arm 48 which is integral with the shaft 49 one end of the rocking lever 46 is in contact with a cam 50 on cam shaft 51 which is set in accordance with the correct timing for fuel injections. The cam shaft 51 is driven by gear wheel 52 which gears with wheel 53 on trunnion 18 of rotary air valve 15 which is driven by chain from sprocket 20 on crank shaft H.

The stroke of the fuel injection valve piston 39, may be either lengthened or shortened by a slight rotation of the shaft 49 in either direction, see Figure 8, this may be done in any well known way such as by a lever 54 and quadrant 55 situated at one end of the engine as shown in Figure 4.

The other end of the rocking lever 46 engages the projecting end 44 of the piston 39.

The operation of the fuel injection valve is as follows:—When the rocking lever 46 is moved outwards at the top by the cam 50 its lower extremity moves inwards thereby driving in the piston 39 and causing it first to close the ring of ports 38 through which the fuel has entered to the valve chamber 56 from the superheating chamber 32 through duct 35 thereby cutting off the accumulator pressure at the time of the injection and second to force the fuel charge imprisoned in the valve chamber 56 and which is still under pressure into the combustion chamber 14 past the valve 42 where it meets the partially compressed air already admitted into the cylinder through the rotary air valve 15 and forms with it an explosive mixture which on the completion of the compression stroke is ignited by the electric sparking plug 57 as in the usual practice.

In operation the cycle of the engine is as follows:—As the crankshaft revolves, the piston, say starting from the bottom of the cylinder moves upwards passing the exhaust ports in cylinder, at the same time the rotating air valve 15 moves round and closes the head of the cylinder; the continued upward movement of the piston compresses the air in cylinder and at the same time the fuel injection valve is operated by its cam and a spray of fuel enters the cylinder in the condition of dry gas and is compressed by the continued upward movement of the piston. When the piston is about to commence its descent the compressed charge is ignited in the usual way by a sparking plug and expansion takes place, driving the piston downwards past the exhaust ports, wherefrom the burnt gases escape through the ports; at the same time the rotation of the air valve 15 has opened its port 16 and admitted into the cylinder a charge of compressed air which sweeps all the burnt gases out through the exhaust ports J and leaves the cylinder full of clean air for the next cycle.

I claim:—

1. In a two cycle high speed internal combustion engine, means for introducing charges of preheated liquid fuel under pressure into compressed air contained in the cylinder thereof, said means comprising a receiver adapted to hold a fixed quantity of said liquid fuel under pressure, a high pressure pump adapted to run at low speed and to force said liquid into the receiver, a mechanically operated fuel injection valve automatically admitting timed charges of fuel into said cylinder, a fuel heating chamber intermediate said receiver and the fuel injection valve, and means independent of the fuel admission for forcing fresh air into the cylinders whilst the exhaust ports are uncovered by the piston.

2. In a two cycle high speed internal combustion engine, means for introducing charges of preheated liquid fuel under pressure into compressed air contained in the cylinder thereof, said means comprising a receiver adapted to hold a fixed quantity of said liquid fuel under pressure, a high pressure pump adapted to run at low speed and to force said liquid into the receiver, a mechanically operated fuel injection valve automatically admitting timed charges of fuel into said cylinder, a fuel heating chamber intermediate said receiver and the fuel injection valve, in combination with an air admission valve comprising a longitudinal cylindrical casing provided with ports communicating with the cylinder, and a rotating hollow cylindrical valve having a port to register with the engine cylinder as it rotates.

3. In a two cycle high speed internal combustion engine, means for introducing charges of preheated liquid fuel under pressure into compressed air contained in the cylinder thereof, said means comprising a receiver adapted to hold a fixed quantity of said liquid fuel under pressure, a high pressure pump adapted to run at low speed and to force the liquid fuel into the receiver, a fuel injection valve for the cylinder, and a fuel heating chamber intermediate the receiver and the injection valve, said receiver consisting of a domed receptacle from the bottom of which a pipe leads to the heating chamber and extends along the top of the cylinder and is cast integrally therewith so as to be in contact with the heat generated therein.

4. In a two cycle high speed internal combustion engine, means for introducing charges of preheated liquid fuel under pressure into compressed air contained in the cylinder thereof, said means comprising a receiver adapted to hold a fixed quantity of said liquid fuel under pressure, a high pressure pump adapted to run at low speed and to force the liquid fuel into the receiver, a fuel injection valve for the cylinder, and a fuel heating chamber intermediate the receiver and the injection valve, said receiver consisting of a domed receptacle from the bottom of which a pipe leads to the heating chamber and extends along the top of the cylinder and is cast integrally therewith so as to be in contact with the heat generated therein, in combination with means to ensure uniform pressure in the receiver said means comprising a spring controlled relief valve for the emission of any surplus fuel therefrom.

5. In a two cycle high speed internal combustion engine, means for introducing charges of preheated liquid fuel under pressure into compressed air contained in the cylinder thereof, said means comprising a valve chamber having an inlet port through which the fuel is admitted into the valve chamber and an outlet port through which the imprisoned charge is forced from the valve chamber into the cylinder, a valve within the valve chamber, and means for actuating the valve to close the inlet ports and thereby cut off the accumulator pressure at the time of the injection and to force the fuel charge imprisoned in the valve chamber while still under pressure into the combustion chamber.

6. In a two cycle high speed internal combustion engine means for introducing charges of preheated liquid fuel under pressure into compressed air contained in the cylinder thereof, said means comprising a valve chamber having an inlet port through which the fuel is admitted into the valve chamber and an outlet port through which the imprisoned charge is forced from the valve chamber into the cylinder, a valve within the valve chamber, and means for actuating the valve to close the inlet ports and thereby cut off the accumulator pressure at the time of the injection and to force the fuel charge imprisoned in the valve chamber while still under pressure into the combustion chamber, in combination with a combustion chamber, means for admitting air thereto to combine with the fuel charge within the cylinder.

In testimony whereof he has affixed his signature in presence of two witnesses.

GEORGE WENTWORTH GRAYSON.

Witnesses:
T. P. ALLEN,
G. GARDNER.